United States Patent
Brown et al.

(10) Patent No.: US 7,050,568 B2
(45) Date of Patent: May 23, 2006

(54) HOLD QUEUE MANAGEMENT

(76) Inventors: Michael Wayne Brown, 529 River Down Rd., Georgetown, TX (US) 78628; David R. Cheng, 702 Hertford Rd., Wilmington, DE (US) 19803; Wing-Ying Stephanie Leung, 921 E. Ann, Ann Arbor, MI (US) 48104; Folu Okunseinde, 383 Lake Ave., Oakhurst, NJ (US) 07755; Michael A. Paolini, 6407 Wallace Cove, Austin, TX (US) 78750; Seema Sheth-Voss, 345 Franklin St., Apt. 206, Cambridge, MA (US) 02139

( * ) Notice: Subject to any disclaimer, the term of this patent is extended or adjusted under 35 U.S.C. 154(b) by 860 days.

(21) Appl. No.: 09/931,991

(22) Filed: Aug. 17, 2001

(65) Prior Publication Data
US 2003/0035531 A1 Feb. 20, 2003

(51) Int. Cl.
*H04M 3/00* (2006.01)
(52) U.S. Cl. .......................... 379/266.01; 379/210.02; 379/266.06
(58) Field of Classification Search ..............................
379/265.01–266.1, 266.06, 210.02; 370/352
See application file for complete search history.

(56) References Cited

U.S. PATENT DOCUMENTS

| 5,946,388 | A | * | 8/1999 | Walker et al. | 379/266.01 |
| 6,002,760 | A | * | 12/1999 | Gisby | 379/266.01 |
| 6,011,845 | A | * | 1/2000 | Nabkel et al. | 379/266.01 |
| 6,400,804 | B1 | * | 6/2002 | Bilder | 379/76 |
| 6,535,601 | B1 | * | 3/2003 | Flockhart et al. | 379/266.01 |
| 6,724,885 | B1 | * | 4/2004 | Deutsch et al. | 379/265.02 |
| 6,735,300 | B1 | * | 5/2004 | Walker et al. | 379/266.01 |
| 6,798,768 | B1 | * | 9/2004 | Gallick et al. | 370/352 |

* cited by examiner

Primary Examiner—Fan Tsang
Assistant Examiner—Md S. Elahee

(57) ABSTRACT

A method, system and product for managing a hold queue is provided. A call center receives an incoming telephone call from at least one caller and places the caller in an initial position in the hold queue. When a caller is in a hold queue at a call center, a request can be made to pause the caller's position in the hold queue. When the caller is ready to return to the hold queue or when the pause duration has expired, the caller becomes active in the hold queue.

17 Claims, 6 Drawing Sheets

Call Ctr XYZ

| Queue Position | Time on w/Attendant | Estimated Hold Time | Attendant Subj. |
|---|---|---|---|
| * | 60 | 10 | A |
| * | 90 | 15 | X |
| * | 72 | 18 | Y |
| 1 | 0 | 10 | - |
| 2 | 0 | 15 | - |
| • | • | • | • |
| • | • | • | • |
| • | • | • | • |
| 25 | 0 | 75 | - |

Pause

FIG. 5

HOLD QUEUE MANAGEMENT

TECHNICAL FIELD

The present invention relates to managing a caller's position in a hold queue. More specifically, the present invention relates to a method, system, and product enabling a caller to pause their position in a hold queue.

DESCRIPTION OF RELATED ART

Telephone-based customer service plays an increasingly important role for organizations involved in activities requiring direct communication with customers. In order to serve a maximum number of callers, call centers are typically designed to optimize call handling efficiency and telephone attendant productivity. Many conventional systems allow telephone attendants to service a greater number of callers by ascertaining the nature of a caller's request through collection, by a live attendant, of initial information from the caller, and transferring the call to a voice response unit to address the specific request of the caller. Other systems reverse the answer and collection process by connecting the caller initially to a voice response unit which collects information on the nature of a caller's request, which is ultimately used to route the call to an appropriate attendant.

A call distribution system is commonly utilized by call centers to enhance attendant productivity. Call distribution systems allow a call center to cost-effectively handle a large number of calls by placing some of the calls in a holding queue when no attendants are available. When a call is placed in the holding queue, a greeting message identifying the called party is typically played to the caller, indicating that the next available attendant will service the call.

Call queuing plays an important role in call center operations and provides many advantages to the call center, including increased attendant productivity, by minimizing idle time for the attendant, simultaneous handling of a greater number of calls during an increase in calls, and encouragement of callers to wait for an available attendant, as opposed to requiring the caller to attempt another call in response to a busy signal.

Customers calling vendors for technical support are at the mercy of that particular vendor's hold queue system. Once in the queue, the caller must wait in the queue for the next available attendant. These waiting periods may be very long and often the caller may need to step away from the phone to take care of an urgent situation. If the caller hangs up or walks away from the phone when an attendant answers they lose their place in the queue. Rising to the top of a hold queue represents an investment of time for a caller in that queue and such an investment should not be lost if possible. A method and system for allowing a caller on hold to pause his connect time point would allow the caller to handle an emergency situation without losing his place in the queue.

SUMMARY OF THE INVENTION

The present invention provides a method, system and product for managing a hold queue. A call center receives an incoming telephone call from at least one caller and places the caller in an initial position in the hold queue. When a caller is in a hold queue at a call center, a request can be made to pause the caller's position in the hold queue. When the caller is ready to return to the hold queue or when the pause duration has expired, the caller becomes active in the hold queue.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a illustration of an exemplary Web page in accordance with one embodiment of the present invention.

DETAILED DESCRIPTION OF THE INVENTION

A method, system and program for pausing a caller's position in a hold queue is provided. In general, a caller is given the opportunity to pause and reinstate his hold position in a queue. The caller uses an input device enabled to send a request to a call center to pause his position in the hold queue. When the caller is ready to return to the hold queue or when the pause duration has expired, the caller's position in the queue is converted back to an on hold status. This system effectively preserves the caller's original time investment in the queue while allowing the caller the flexibility to move away from the phone while on hold.

A caller's position in a hold queue is "paused" when an original estimated connect time with an attendant is delayed. The call center may move the caller's current hold position down in the queue or suspend the current hold position for a specific period of time. Both of these options may be requested by the caller and/or implemented automatically in the event the caller is unavailable when an attendant is ready to take the call. Due to the dynamics of hold queues, the caller may pause his position and return in the same position as if he never left the phone.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention may be executed in a variety of systems, including a variety of computing systems and electronic devices under a number of different operating systems. In one embodiment of the present invention, the queue management system is a computer system that incorporates communication features that provide telephony, messaging and information services to a plurality of callers. In general, the present invention is preferably executed in a computer system that performs computing tasks such as manipulating data in storage that is accessible to the computer system.

Figure 1:
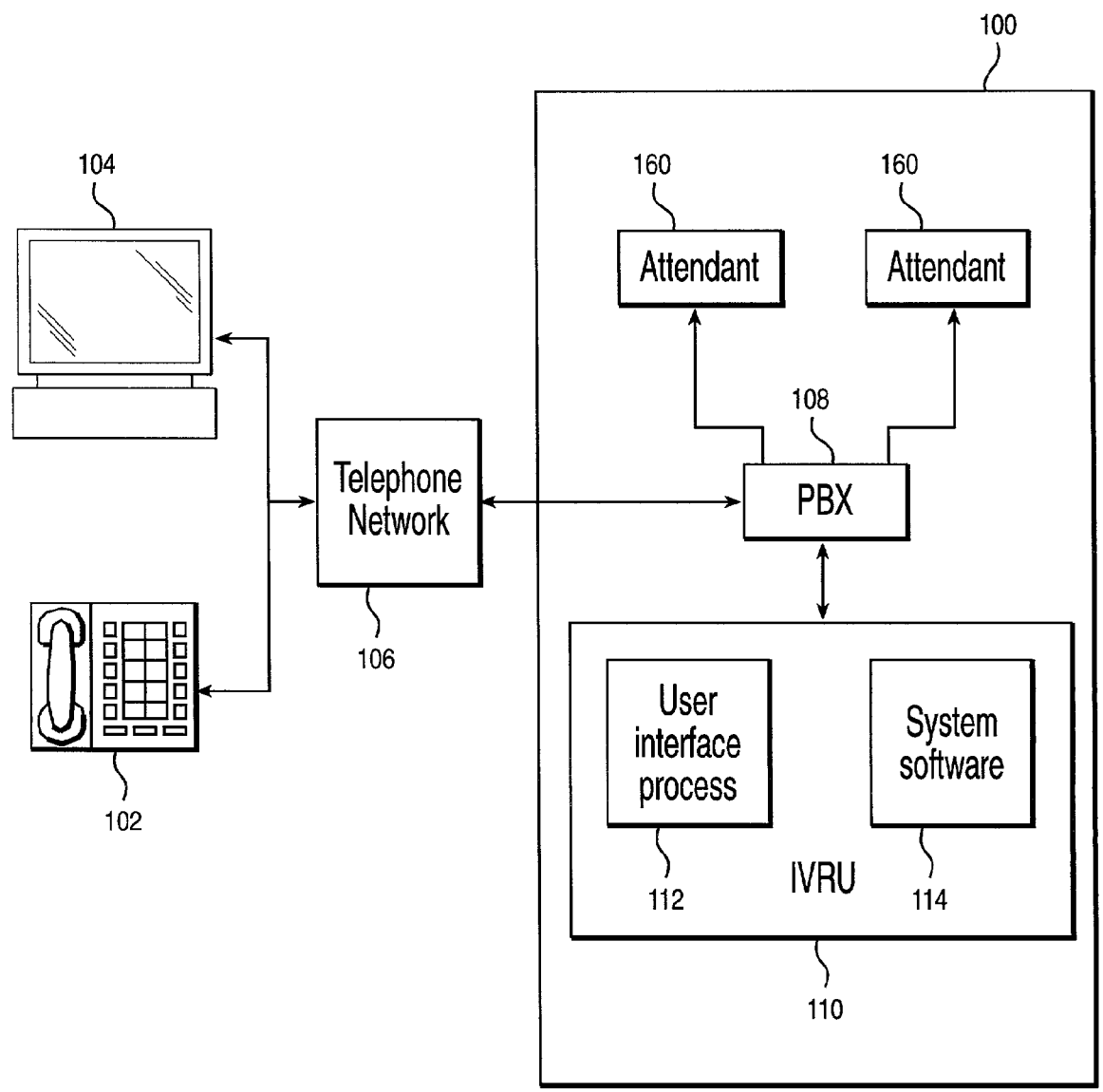
FIG. 1 is a block diagram of a communication system in accordance with one embodiment of the present invention.

Referring now to the drawings and in particular FIG. 1, there is depicted an illustrative network environment for transferring information, between one or more callers at station sets 102, 104 and a call center 100 over an external network 106. A caller at a station set, such as station set 102, places a call to call center 100. Station set 102 may be a conventional telephone, video phone or personal computer configured with appropriate telephony software and Internet connectivity. The call is routed via telephone network 106, discussed below, to the call center 100, in a conventional manner. The call preferably is routed within call center 100 to a Private Branch Exchange switch (PBX) with some type of automated call distribution capability. PBX 108 is preferably connected to an interactive voice response unit (IVRU) 110. As discussed further below, PBX 108 and IVRU 110 may comprise conventional hardware and software, as modified herein to carry out the functions and operations of the present invention.

PBX 108 is discussed more fully below in conjunction with FIG. 2. An example of a PBX suitable for use in the present invention is a AT&T Definity PBX with Automatic Call Distribution (ACD) capability, available from AT&T corporation, as modified herein to execute the functions and operations of the present invention. Generally, PBX 108 is a switching system designed to receive calls destined for call center 100, and queue them when an appropriate attendant is not available. In addition, PBX 108 distributes calls to attendants or specific groups of attendants according to a prearranged scheme, to ensure even call handling loads among attendants, in a known manner. The ACD functionality can be integrated with PBX, as in the illustrative embodiment shown in FIG. 1, or provided by a separate unit.

IVRU 110 is a voice information system which may be arranged to (i) prompt a caller for specific information by asking questions based on a set of modules in a transaction script, (ii) collect that information by detecting and interpreting dual tone multifrequency (DTMF) signals entered by the caller or by recognizing speech input from the caller, (iii) organize the collected information in a specific format and (iv) forward the collected information to PBX 108. The AT&T Conversant Voice System is an example of an IVRU suitable for use in the present invention.

Generally, IVRU 110 includes a central processing unit (CPU) (not shown) which executes a user-interface process 112 and a system software process 114. User-interface process 112 includes a transaction script including a sequence of questions to be posed to a caller to elicit answers in the form of DTMF signals or speech input. The modules of a transaction script are executed in a specified order (which may vary based on the caller's responses) to answer incoming calls destined for call center 100 and to greet callers with pre-recorded voice prompts to direct callers to enter specific information to process their calls. System software process 114, on the other hand, includes primitives to detect DTMF signals entered by the caller and speech recognition software to identify speech input provided by a caller.

PBX 108 and IVRU 110 are coupled for data communications via a cable, wireless or other means suitable to transfer digitally encoded data and other information, including voice signals. The transmitted data and other information may represent caller name and identification number, specific information entered by the caller in response to the sequence of posed questions, and hold pause requests.

In practice, once an attendant is available, IVRU 110 preferably plays a short message to the caller indicating that the call is being connected to a live attendant and transfers the call along with any collected data to PBX 108. The collected data is thereafter forwarded by PBX 108 to an available attendant console 160 for display to the attendant who handles the call. Each attendant console 160 preferably includes a station set and an associated console or general purpose computer to enter or receive data required to complete a transaction with a caller.

Figure 2:
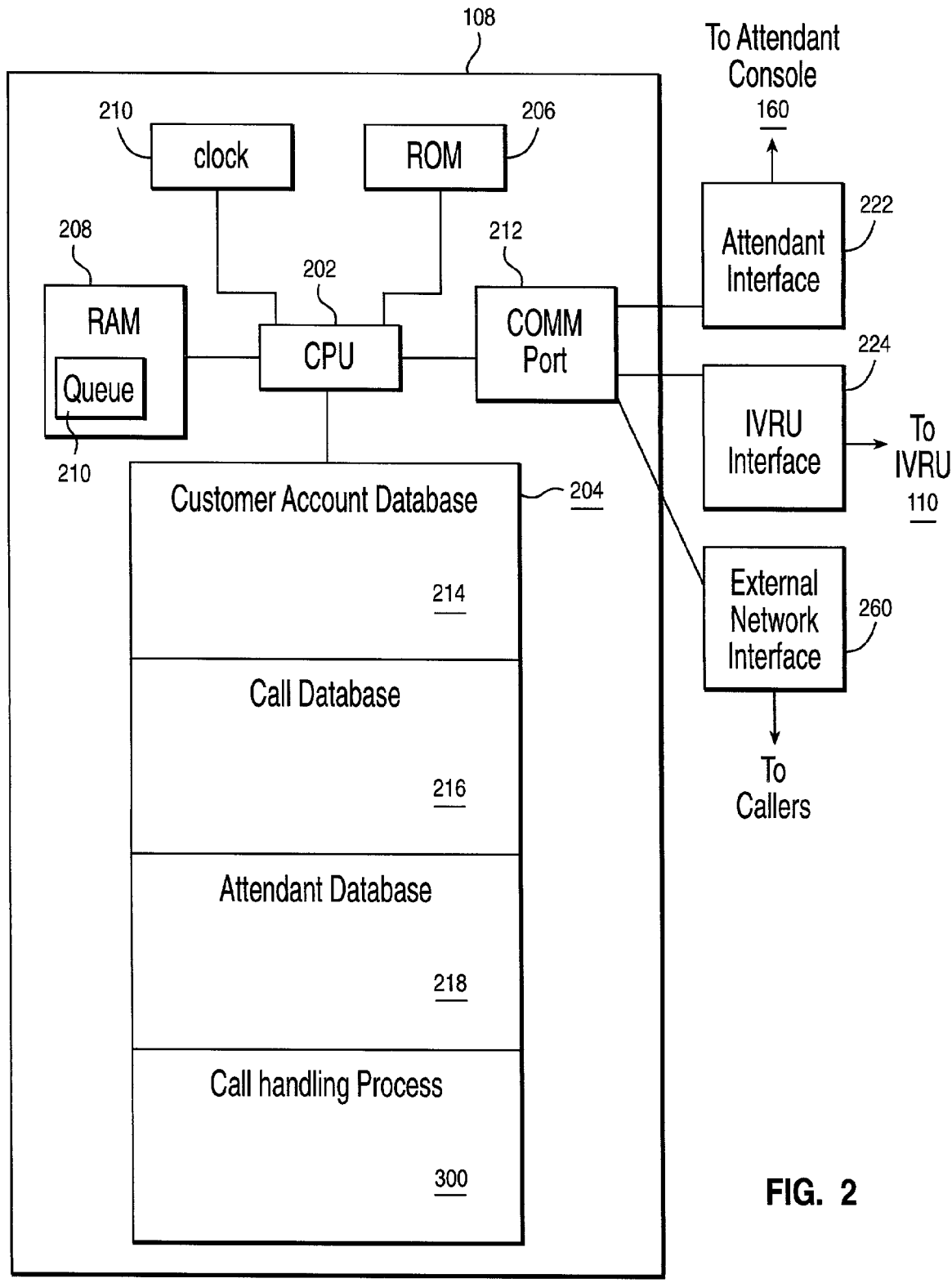
FIG. 2 is a block diagram of a PBX illustrated in FIG. 1.

FIG. 2 is a block diagram of an illustrative PBX 108. PBX 108 preferably includes certain standard hardware components, such as a central processing unit (CPU) 202, a data storage device 204, a read only memory (ROM) 206, a random access memory (RAM) 208, a clock 210, and a communications port 212. The CPU 202 is preferably linked to each of the other listed elements, either by means of a shared data bus, or dedicated connections, as shown in FIG. 2.

CPU 202 may be a single processor, or a number of processors operating in parallel. Data storage device 204 and/or ROM 206 are operable to store one or more instructions, which CPU 202 is operable to retrieve, interpret and execute. RAM 208 preferably stores queue 210 of indicators describing the order of the queued calls directed to the call center, including the status of queued calls. CPU 202 preferably includes a control unit, an arithmetic logic unit (ALU), and a CPU local memory storage device, such as, for example, a stackable cache or a plurality of registers, in a known manner.

The control unit is operable to retrieve instructions from data storage device 204 or ROM 206. The ALU is operable to perform a plurality of operations needed to carry out instructions. The CPU local memory storage device is operable to provide high speed storage used for storing temporary results and control information.

Data storage device 204 may include a customer account database 214, a call database 216, and an attendant database 218. The customer account database 214 stores information on each customer, such as biographical information and purchase history information. The call database 216 stores information on each call being processed by the call center 100, including an indication of the position of the call within the queue 210 and paused calls. The attendant database 218 stores information on each attendant, including an indication of the availability status of each attendant and his respective expertise.

In addition, the data storage device 204 preferably includes a call handling process 300, discussed further below. Generally, the call handling process 300 allows PBX 108 to (i) route a call to an appropriate attendant console 160 within a pool of attendants, (ii) transfer calls to the IVRU 110 when no attendants are available to service a particular call. (iii) place a call in a holding queue, if needed, (iv) place a call on hold in a pause status, and (v) remove the call from pause status.

Communications port 212 connects PBX 108 to an attendant interface 222, an IVRU interface 224 and an external network interface 260, thereby linking the PBX 108 to each attendant console 160, IVRU 110 and the external network, respectively. Communications port 212 preferably includes multiple communication channels for simultaneously establishing a plurality of connections.

Figure 3A:
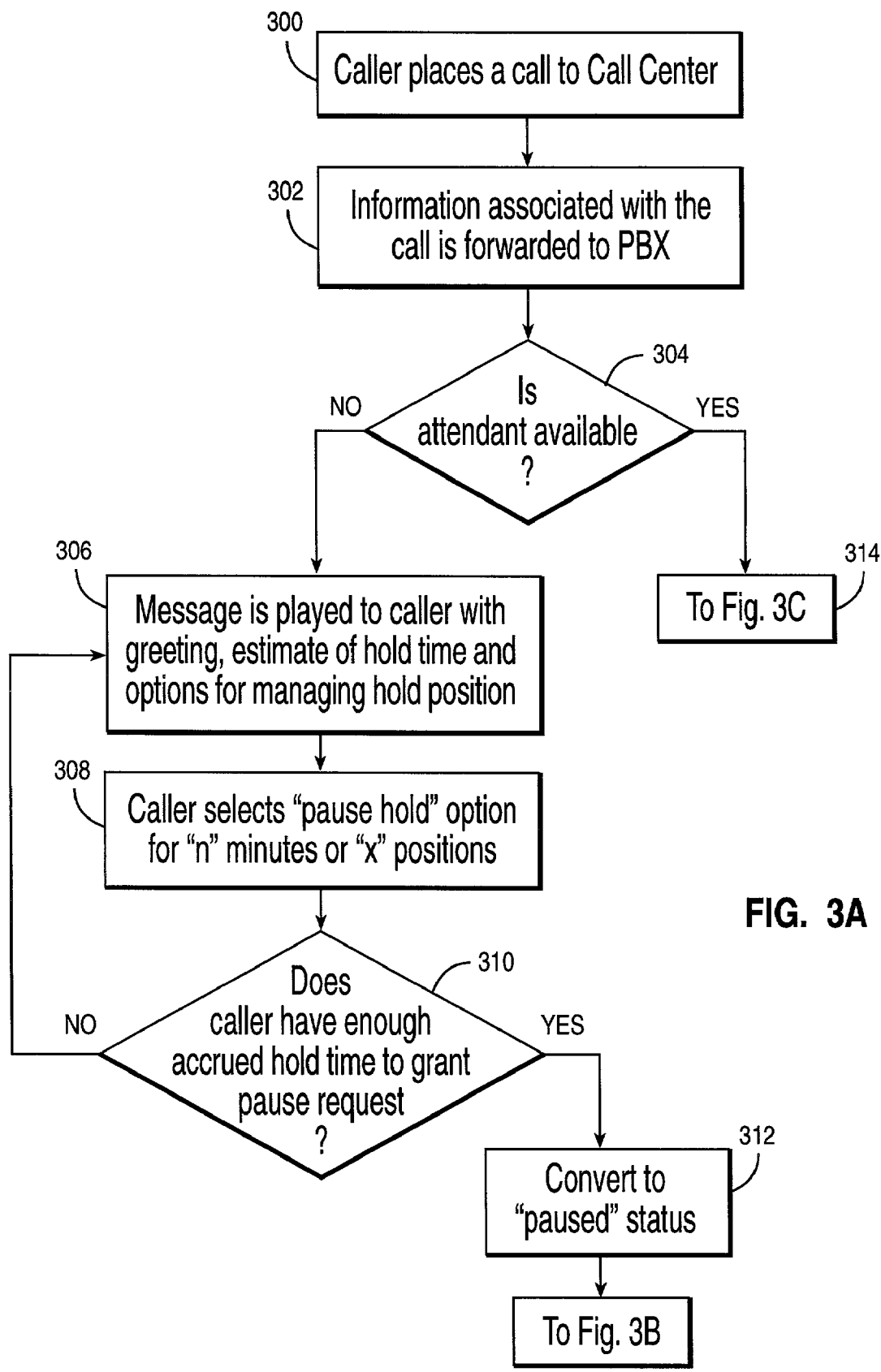
FIGS. 3a–3c are flow diagrams describing an exemplary call handling process in accordance with one embodiment of the present invention.
Figure 3B:
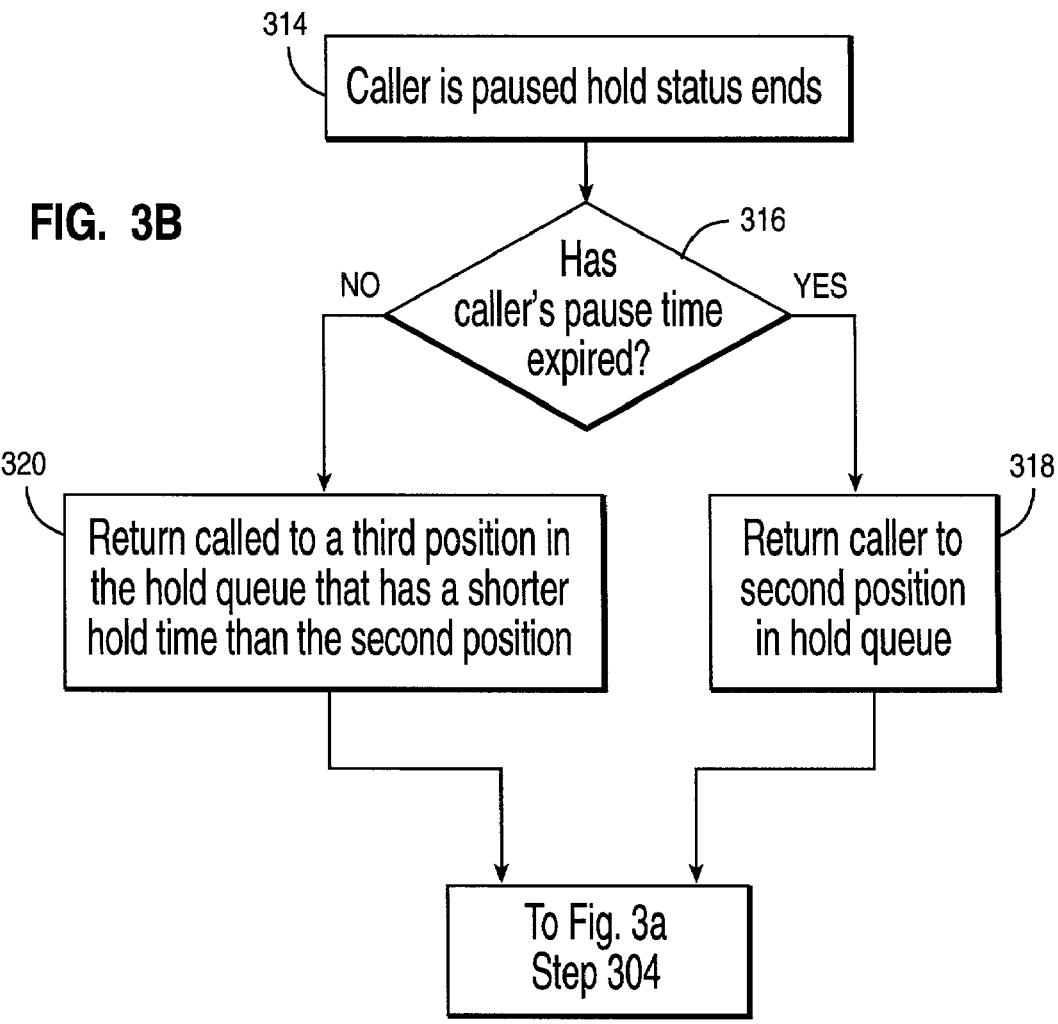

FIGS. 3a and 3b are flow diagrams illustrating call handling process 300 used to pause the hold status of a call in accordance with one embodiment of the present invention. This process 300 is illustrated with reference to the architecture outlined in FIGS. 1 and 2, however, it should be noted that the process will work equally well in other architectures that perform call queueing functions. The process begins at step 300 when a caller places a call to a call center. Information associated with the call is forwarded to a PBX, step 302. The process queries for available attendants, step 304. If attendants are available, then the call is routed to an attendant and the queuing process for that particular call ends. If there are no attendants available, then a message is transmitted to the caller with a greeting, estimate of hold time and options for managing the caller's hold position, step 306. At this point, the caller is in the hold queue and is able to access a variety of information regarding his position in the hold queue. The caller may be presented with a menu of options, discussed below, to access a particular information item and/or execute a pause request. If the caller decides they need to pause their current hold position, the caller selects the "pause" option on their input device and enters the amount of time, in minutes, that they want to pause, step 308. Alternatively, the caller may request to move his postion down a number of positions in the queue, for example if each call is taking approximately 5 minutes, and the caller would like to pause for approximately 15 minutes, then the caller may request to be moved down three positions in the queue. Although the caller moved down in the queue three spots, the hold time may end up being shorter or longer than 15 minutes, due to the dynamics of hold queues. The process then checks to verify that the caller has been on hold for an amount of time sufficient to grant the amount of time requested for the pause, step 310. If the answer in step 310 is yes, then the caller's hold position is paused, step 312. If the answer in step 310 is no, then the message in step 306 is replayed, essentially denying the request to pause. Step 310 is preferred, however it is not critical to carrying out the present invention. Alternatively, a message is played explaining how much pause time is accrued based on the amount of time the caller has currently been on hold. For example, for every 10 minutes the caller is on hold, the call handling process may assign up to 5 minutes of pause time, so if the caller has been on hold for 30 minutes, they may request from 1 to 15 minutes of pause time. Although not preferred, another alternative would be to allow a caller to pause for any amount of time regardless of the amount of time they have been on hold.

A caller's pause status may be converted to on hold status, step 314 in one of two ways. The process checks if the pause duration has expired, step 316. If the pause duration has expired, then the caller is returned to the hold queue and placed in a second hold queue position. The second hold queue position is used herein for purposes of explanation to define the caller's position in the queue when he returns to the queue as opposed to the caller's position in the queue when he initially requested to pause his position (this being the first position). In practice, the call center may put the caller in a second position that is essentially the same as the first position. For example, if the caller's first position had about 10 minutes to go before the call was to be answered, and the caller requested a pause of about 15 minutes, then when the pause time expires, the caller could be placed back in the queue at a second position with 10 minutes to go before the call is to be answered. This scenario would also apply to pausing for a number of positions in the queue. How the pause time and the second position are determined is up to the individual call center. Any number of variations could be implemented based on classes of customers, types of calls, for example, a preferred customer may receive more pause time than a regular customer.

Alternatively, if the caller requests to end his pause status before the end of his elected pause duration, then the call may be returned a third hold queue position that is shorter than the second hold queue position, step 320. Giving the caller a shorter hold time for returning early from a paused status provides an incentive for the caller to move through the hold queue. Regardless of the second or third position, call process 300 returns to step 304 (FIG. 3a) where the process checks for available attendants and the process continues as explained above.

Figure 3C:
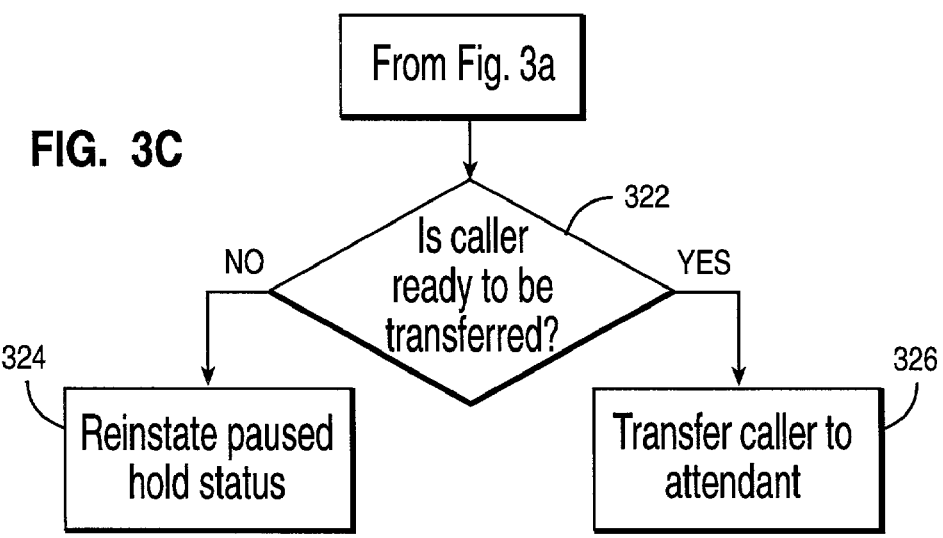

Referring now to FIG. 3c, in the event the caller is not available when his pause time expires or if he needs more time the caller's position can be paused automatically by the process 300 or manually by an attendant at the call center. The process proceeds from FIG. 5a at step 114 to check if the caller is ready to be transferred, step 322. If the caller is not ready, then the process proceeds to pause the caller's hold position, step 324. If the caller is ready for the attendant, then the call is transferred, step 322. In this embodiment, the attendant may pause the caller's hold position, or the process 300 may detect that the caller is not on the line and pause the call accordingly.

Figure 4:
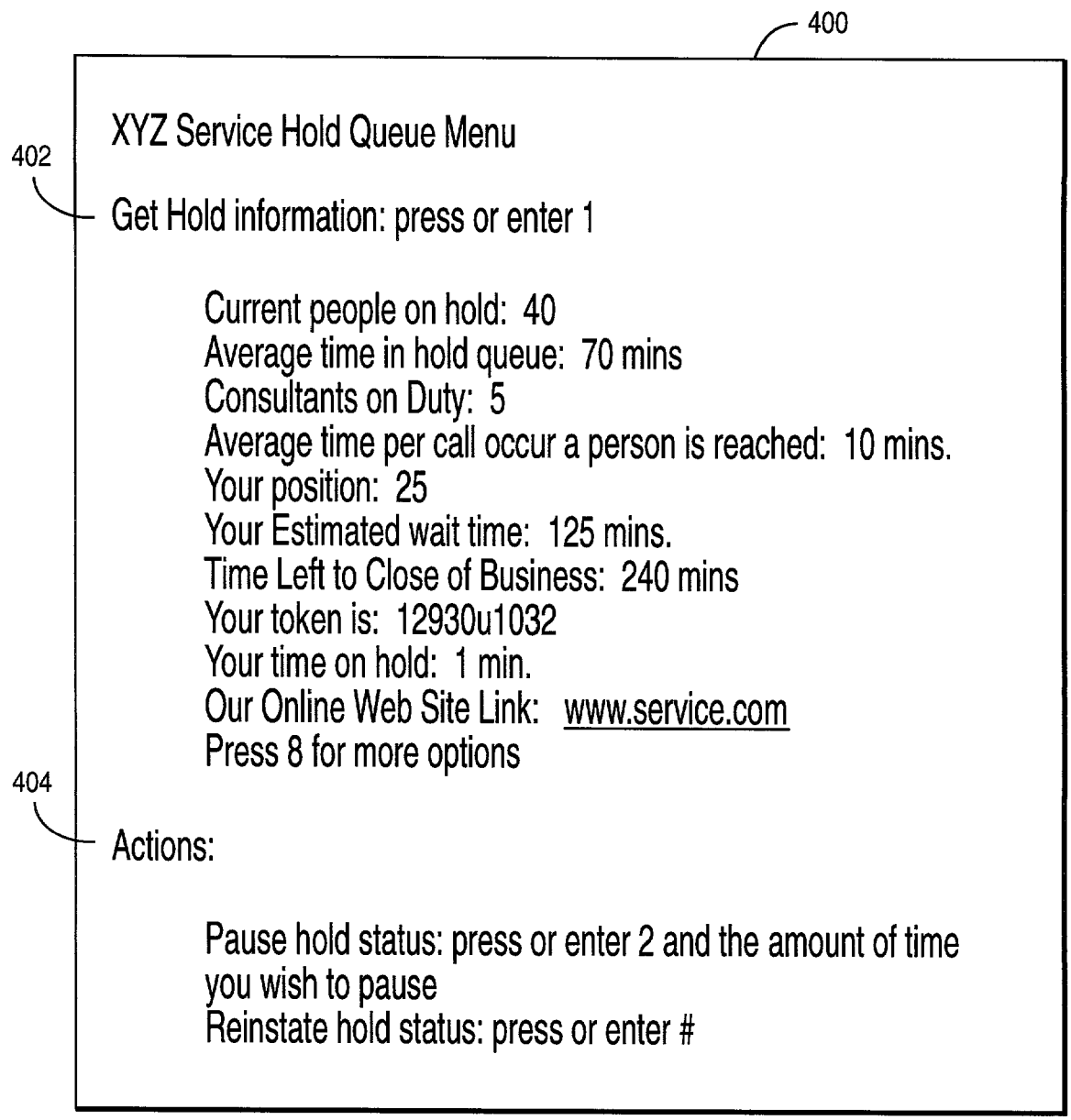
FIG. 4 is an illustration of exemplary menu items in accordance with one embodiment of the present invention.

FIG. 4 is an illustration of a menu structure 400 displaying potential menu options and information presented to the caller while on hold. The call center presents options to get hold information 402, which includes but is not limited to the number of people currently on hold, average time each caller is on hold, average time per call once connected with an attendant, the caller's position in the queue, the caller's estimated hold time etc. The caller may be provided with a token or id that allows the caller to access their information while in the queue at any time. This information is useful to the caller for managing their time while on hold, such that the caller can judge how long he can pause his own hold time if the need arises. The menu 400 also presents the caller with options 404 to pause their hold status and reinstate their hold status by performing certain actions. Menu 400 may be presented to the caller in an audio format over the phone or in a video format to a video phone, in which the caller would enter their requests via a keypad or through speech recognition. Alternatively, the menu may be presented to the caller on a Web page that the caller can access with a token or id provided by the call center.

FIG. 5 is an illustration of a Web page 500 presenting information about the hold queue. The caller is able to see where they are in the hold queue and where other callers are in the queue. Optional information such as the subject of the call may be displayed to give the caller even more information as to how the different callers will effect his hold time in the queue. Web page 500 also includes a button for the user to push or select to pause his position in the hold queue. As described above, the information displayed on the Web page likewise, can be presented to the caller in an audio format or to a video phone.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such an, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A method of managing a hold queue at a call center comprising:
   receiving an incoming telephone call from at least one caller;
   placing the caller in a first position in the hold queue;
   informing caller of estimated hold time and options for managing caller's hold position;
   responsive to a request from a caller, pausing the first position in the hold queue to create a paused hold status wherein caller remains in position in the queue while caller can opt to move away from telephone while on hold without losing caller's position in the queue;
   requesting by the caller an amount of time for paused hold period;
   determining when the requested paused hold period has ended; and
   placing the call back into the hold queue at paused position.

2. The method of claim 1, further comprising returning the caller to an on hold status to create a second position in the hold queue, wherein the second position in the hold queue is shorter than or equal to the first position in the hold queue.

3. The method of claim 1 wherein the request comprises changing the caller's position in the hold queue.

4. The method of claim 1 wherein the request comprises pausing the caller's position for a period of time.

5. The method of claim 1 further comprising crediting pause time to the caller based on the amount of time the caller has been in the hold queue.

6. The method of claim 1 wherein the caller has been on hold for a period of time not less than the period of time requested.

7. The method of claim 1 further comprising forwarding the call to an attendant when the attendant is available.

8. A method of managing a hold queue at a call center comprising:
   receiving an incoming telephone call from at least one caller;
   placing the caller in a first position in the hold queue;
   informing the caller of estimated hold time and options for managing caller's hold position;
   pausing the first position in the hold queue to create a paused hold status wherein caller remains in position in the queue while caller can opt to move away from telephone while on hold without losing caller's position in the queue;
   requesting by the caller an amount of time for paused hold period;
   determining when the requested paused hold period has ended; and
   placing the call back into the hold queue at paused position.

9. The method of claim 8 further comprising detecting that the caller is unavailable for connection to an attendant.

10. The method of claim 8 further comprising receiving a request from a caller to pause the first position in the hold queue.

11. The method of claim 10 wherein the request comprises changing the caller's position in the hold queue.

12. The method of claim 10 wherein the request comprises pausing the caller's position for a period of time.

13. A method comprising:
    receiving an incoming telephone call from a caller;
    placing the call in a hold queue;
    informing caller of estimated hold time and options for managing caller's hold position;
    monitoring how long the caller has been on hold;
    receiving a request from the caller to pause a first position in a hold queue for a period of time;
    granting the request based on the amount of time the caller has been on hold wherein caller remains in the first position in the queue while caller can opt to move away from telephone while on hold without losing caller's position in the queue; and
    placing the call back into the hold queue at paused position.

14. The method of claim 13 further comprising, returning the party to an on hold status to create a second position in the hold queue, wherein the second position in the hold queue is shorter than or equal to the first position in the hold queue.

15. The method of claim 14 further comprising, decreasing the amount of time on hold in the second position if the party returns to an on hold status before the expiration of the requested pause time.

16. A system for managing a hold queue at a call center comprising:
    a communications device for receiving a call;
    means for receiving an incoming telephone call from at least one caller;
    means for placing the caller in a first position in the hold queue;
    means for informing caller of estimated hold time and options for managing caller's hold position;
    means responsive to a request from a caller, for pausing the first position in the hold queue for a period of time to create a paused hold status wherein caller remains in the first position in the queue while caller can opt to move away from telephone while on hold without losing caller's position in the queue;
    means for requesting by the caller an amount of time for paused hold period;
    means for determining when the requested paused hold period has ended; and
    means for placing the call back into the hold queue at paused position.

17. A computer program product for managing a hold queue at a call center, the computer program product comprising:
    a recorded medium;

means, recorded on the recording medium, for receiving an incoming telephone call from at least one caller;

means, recorded on the recording medium, for placing the caller in a first position in the hold queue;

means, recorded on the recording medium, for informing caller of estimated hold time and options for managing caller's hold position;

means, recorded on the recording medium, for pausing the first position in the hold queue for a period of time to create a paused hold status wherein caller remains in the first position in the queue while caller can opt to move away from telephone while on hold without losing caller's position in the queue;

means, recorded on the recording medium, for requesting by the caller an amount of time for paused hold period;

means, recorded on the recording medium, for determining when the requested paused hold period has ended; and means, recorded on the recording medium, for placing the call back into the hold queue at paused position.

* * * * *